US008852736B2

(12) United States Patent
Song et al.

(10) Patent No.: US 8,852,736 B2

(45) Date of Patent: Oct. 7, 2014

(54) METHOD OF FORMING A RECONSTITUTED WOOD BLOCK

(76) Inventors: Jianping Song, Zhejiang (CN); Pete Nichols, Boulder, CO (US)

( * ) Notice: Subject to any disclaimer, the term of this patent is extended or adjusted under 35 U.S.C. 154(b) by 724 days.

(21) Appl. No.: 12/992,866

(22) PCT Filed: May 7, 2009

(86) PCT No.: PCT/US2009/043115
§ 371 (c)(1),
(2), (4) Date: Jun. 6, 2011

(87) PCT Pub. No.: WO2009/140136
PCT Pub. Date: Nov. 19, 2009

(65) Prior Publication Data

US 2011/0311798 A1 Dec. 22, 2011

(30) Foreign Application Priority Data

May 13, 2008 (CN) .......................... 2008 1 0061422
May 22, 2008 (CN) .......................... 2008 1 0062058
Jun. 19, 2008 (CN) .......................... 2008 1 0062493

(51) Int. Cl.
*B32B 5/16* (2006.01)

(52) U.S. Cl.
USPC ............ 428/323; 428/326; 428/402; 428/536

(58) Field of Classification Search
USPC ................................. 428/323, 326, 402, 536
See application file for complete search history.

(56) References Cited

U.S. PATENT DOCUMENTS

| | | | | |
|---|---|---|---|---|
| 3,905,172 | A | 9/1975 | Blackburn | |
| 4,393,019 | A | 7/1983 | Geimer | |
| 6,113,729 | A | 9/2000 | Chiu | |
| 6,306,241 | B1 | 10/2001 | Chiu | |
| 6,428,871 | B1 | 8/2002 | Cozzolino | |
| 7,183,339 | B2 * | 2/2007 | Shen et al. | 524/13 |
| 2002/0160114 | A1 | 10/2002 | Cozzolino | |
| 2008/0134296 | A1 | 6/2008 | Amitai et al. | |
| 2009/0011279 | A1 | 1/2009 | Wisenbaker, Jr. et al. | |
| 2009/0011670 | A1 | 1/2009 | Wisenbaker, Jr. et al. | |
| 2009/0025850 | A1 | 1/2009 | Feigin et al. | |
| 2010/0075095 | A1 | 3/2010 | Johnson et al. | |
| 2010/0119857 | A1 | 5/2010 | Johnson et al. | |
| 2010/0178451 | A1 | 7/2010 | Li | |

FOREIGN PATENT DOCUMENTS

| | | |
|---|---|---|
| CN | 1387981 | 1/2003 |
| CN | 2629939 | 8/2004 |
| CN | 201058448 | 5/2008 |
| CN | 201124519 | 10/2008 |
| EP | 873829 | * 10/1998 |
| EP | 1815955 | * 8/2007 |
| JP | 10-235620 | 9/1998 |
| WO | WO 2008/137639 | 11/2008 |
| WO | WO 2010/032080 | 3/2010 |
| WO | WO 2010/082137 | 7/2010 |
| WO | WO 2011/085518 | 7/2011 |
| WO | WO 2011/085554 | 7/2011 |
| WO | WO 2011/085556 | 7/2011 |

OTHER PUBLICATIONS

Structural Composite Lumber; Techline, Properties and Use of Wood, Composites, and Fiber; US forest Service Department of Agriculture; 1 page; Oct. 1999.

Timberstrand® LSL Quality Lumber for Quality Doors; Weyerhaeuser Hardwoods and Industrial Products; 2 pages; Downloaded Feb. 24, 2009.

* cited by examiner

*Primary Examiner* — Leszek Kiliman

(74) *Attorney, Agent, or Firm* — Thorpe North & Western LLP

(57) ABSTRACT

A method of forming a reconstituted wood block can include providing a recovered wood having a high aspect ratio along wood grains of the recovered wood. The recovered wood can be radially crushed or obtained as strips of recovered veneer. The recovered wood can be pretreated to increase resin absorption to form a degreased wood. The degreased wood can then be dried sufficient to reduce a moisture content to produce a dried wood. The dried wood can be soaked in a resin solution to form a resin impregnated wood. The resin impregnated wood can be dried to reduce the moisture content without substantially curing the resin to form a dried resin impregnated wood. The dried resin impregnated wood can then be molded having wood fibers oriented in a non-random predetermined pattern substantially common direction and compacted to form an uncured molded wood. The pattern can be oriented along a substantially common direction or portions may be oriented transverse to others to obtain a knotted appearance. The uncured molded wood can then be cured to form the reconstituted wood block.

14 Claims, 4 Drawing Sheets

METHOD OF FORMING A RECONSTITUTED WOOD BLOCK

RELATED APPLICATIONS

This application claims priority to Chinese Application No. 200810061422.4, filed May 13, 2008, entitled "A Method of Utilizing Small Firewood to Produce Moulded Wood," Chinese Application No. 200810062058.3, filed May 22, 2008, entitled "A Method of Utilizing Secondary-Grade Processed Wood to Produce Reconstituted Moulded Wood," and Chinese Application No. 200810062493.6, filed Jun. 19, 2008, entitled "A Process of Producing Dyed Reconstituted Moulded Wood," each of which is incorporated herein by reference in their entireties.

BACKGROUND OF THE INVENTION

With the rapid development of furniture, wood flooring and papermaking trades worldwide, a large quantity of log resources are consumed and forest resources reduced. In addition to the severe damage to forests, the situation can also cause soil erosion and environmental deterioration. However, the market demand for furniture and wood floor continues to increase.

To produce molded wood with full tree logs, it is necessary to pretreat the logs by aging, degreasing and antisepsis. These pretreatments require a long time and produce a large quantity of scraps during the process. Most logs have the shortcomings of cracks, unpredictable deformation and warping, and poor resistance to water and sunshine. Further, reconstituted decorative wood manufacturers produce a large quantity of waste scraps during production processes. Most of these scraps are disposed of as garbage, causing huge waste.

SUMMARY OF THE INVENTION

The economic and cultural pressures resulting from gradual decrease of forest resources in China and other countries, utilizing waste scraps and other secondary-grade woods to produce reconstituted decorative wood can not only save rare natural resources, but also help environment protection and decreased deforestation. In light of these problems and deficiencies, the present invention provides a method of manufacturing molded and/or formed wood. More specifically, the method can utilize veneer, scrap wood, splint, branches, and other secondary-grade or processed wood to replace logs in producing reconstituted molded wood.

A method of forming a reconstituted wood block can include radially crushing a recovered wood along wood fibers to form a crushed wood. The recovered wood can be any of a wide variety of woods, and of any wood type that is non-timber size and dimension. Typically, such wood can have visibly identifiable wood grains still present. The crushed wood can be pretreated to increase resin absorption to form a degreased wood. The degreased wood can then be dried sufficient to reduce a moisture content to produce a dried wood. The dried wood can be soaked in a resin solution to form a resin impregnated wood. The resin impregnated wood can be dried to reduce the moisture content without substantially curing the resin to form a dried resin impregnated wood. The dried resin impregnated wood can then be molded having wood fibers oriented in a substantially common direction, or in a multitude of directions that adhere to any formation that is designed to give a planned fiber orientation to form an uncured molded wood. The uncured molded wood can then be cured to form the reconstituted wood block.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention and they are, therefore, not to be considered limiting of its scope. It will be readily appreciated that the components of the present invention, as generally described and illustrated in the figures herein, could be arranged, sized, and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
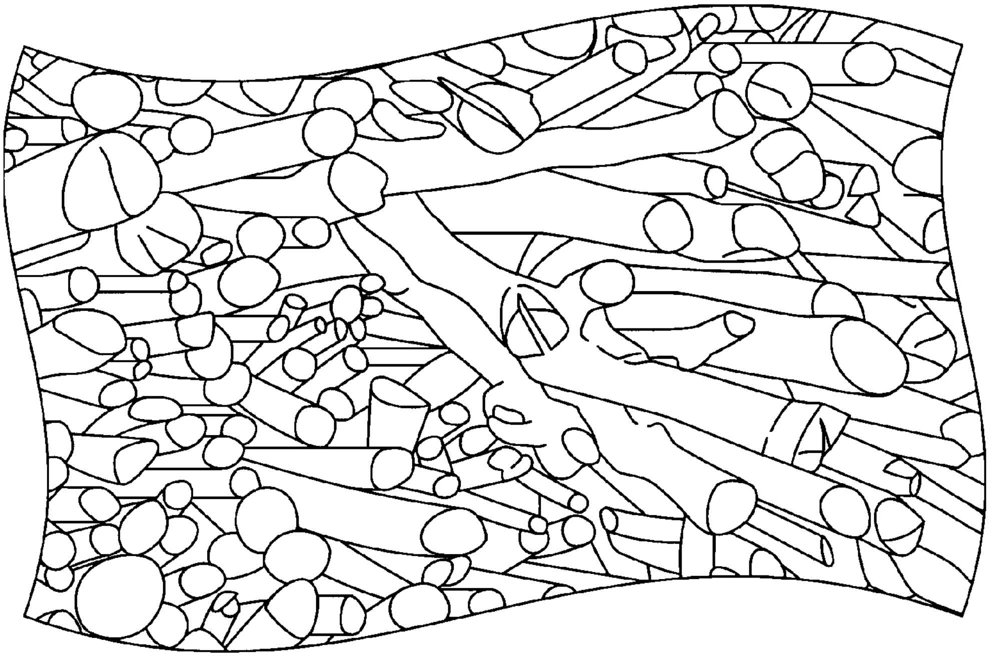
FIG. 1 is a schematic of milling wood scraps as a wood source in accordance with one embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Definitions

In describing and claiming the present invention, the following terminology will be used.

The singular forms "a," "an," and "the" include plural referents unless the context clearly dictates otherwise. Thus, for example, reference to "a press" includes reference to one or more of such materials and reference to "soaking" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As use herein, "laminate layers" refers to layers of material which extend across a plane of the article. Such laminate layers are also substantially planar and parallel to adjacent layers.

As used herein, "wood" refers to material obtained from trees or shrubs but not weeds, grasses such as bamboo, or the like.

As used herein, "wood fibers" and "wood grains" are used interchangeably and refer generally to longitudinal striations in wood associated with growth rings. Wood fibers and the associated strands used in the present invention generally, but not always, rigorously follow the actual wood grains.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

A method of forming a reconstituted wood block can include providing a recovered wood having a high aspect ratio along wood fibers or wood grains of the recovered wood. In one aspect, the recovered wood can be provided by radially crushing, slitting, stranding, or compiling a recovered wood along wood fibers to form a crushed wood, or crushed wood components. The recovered wood can be provided as an industrial leftover or as a primary harvested wood. In another aspect, the recovered wood can be veneer scraps which are non-laminated, e.g. a single thin layer of wood. Generally, the recovered wood can comprise branches, brushwood, poles (e.g. scaffolding poles), rotary milling scraps, milling wood scraps, veneers, or other wood pieces and small diameter wood. For example, many milling processes can produce scraps which are too small for conventional mill products, or historically found uneconomical to produce. FIG. 1 illustrates a collection of milling scraps having a high aspect ratio suitable for use in the present invention. This can include branches which are removed from a tree trunk before milling, milling scraps, or other trimmed wood material. As a general rule, the scraps can have dimensions from about several millimeters to tens of meters, with lengths typically up to about 2 m and widths less than about 8 cm. However, the length of recovered wood along grains typically is at least about 5 cm, and in most cases greater than about 3 meter (e.g. Mulberry) and 5 cm to 5 meters (e.g. high-tech). The recovered wood can have a high aspect ratio, e.g. greater than 7:1, in some cases greater than 10:1, and often greater than 100:1. Typically, the wood is provided as long strands although other forms can also be used.

Figure 2:
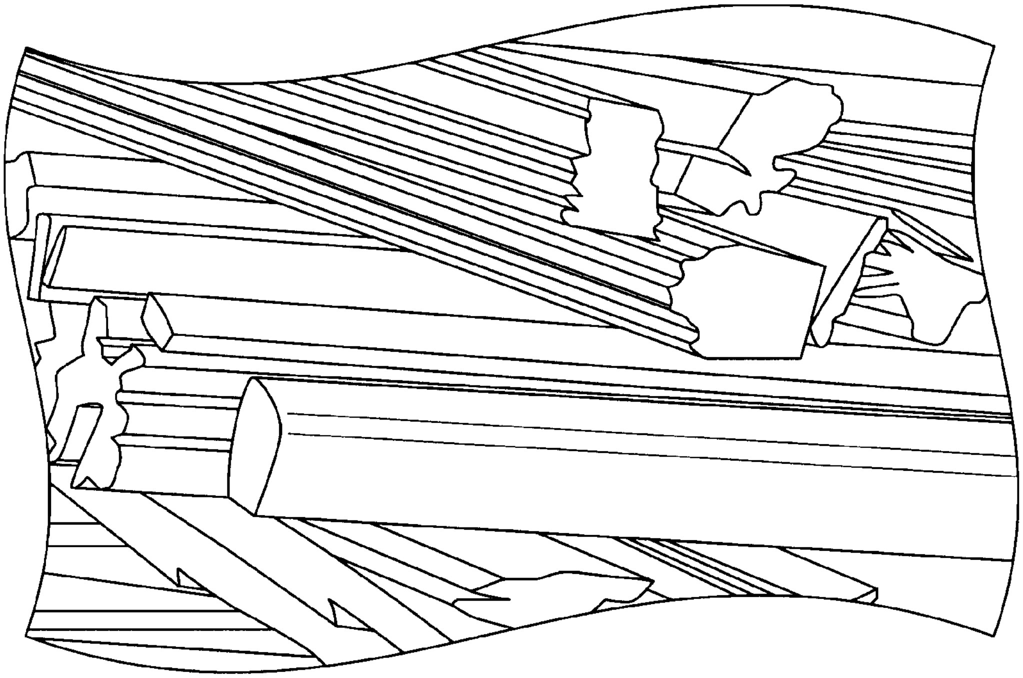
FIG. 2 is a schematic of mulberry branches, or any other wood branch composition as a wood source in accordance with one embodiment of the present invention.

In addition, a large number of trees and wood-bearing plants can provide renewable sources of wood. Non-limiting examples of suitable wood sources include mulberry branches, batten branches, recovered branches from deadfall or timber harvesting operations, pinewood branches, wingceltis, brushwood, and the like. Other woods such as, but not limited to, cedar, mahogany, maple, etc. can be utilized when recovered from other milling or industrial processes. Low grades of wood from coniferous trees and broad-leaved trees can also be particularly suitable for use as the wood source. Such wood materials can be used alone or in combination, depending on the desired appearance of the final product. Each of these woods can have unique benefits, and allow for the desired visual outcome. For example, mulberry trees are relatively rapid growth trees which are commonly used in silk production, medicinal formulations and pharmaceuticals. During production, the leaves and/or bark are removed. Subsequent to such production, the remaining branches are typically discarded. Such branches can be particularly useful for the present invention in terms of appearance and performance. FIG. 2 shows a collection of mulberry branches having a variety of dimensions, thicknesses and diameters. Suitable secondary-grade processed wood can be inferior wood grades with a mass lower than coniferous trees and broad-leaved trees but still have considerable utilizing value. Scraps left after rotary cutting from a log and veneers of reconstituted decorative wood can generally have a thickness of about 0.3 mm to about 5 mm, but can be thicker (e.g. can be used for rotary peeled face material by-product). Typically, the veneers are non-laminated and are simply single layer thin pieces of wood. These types of recovered wood often do not need to be crushed or cut. For example, recovered veneers are often strips no more than 2 to 3 inches wide. Such thin cross-sections allows the resin to permeate throughout without further crushing or cutting.

Figure 3:
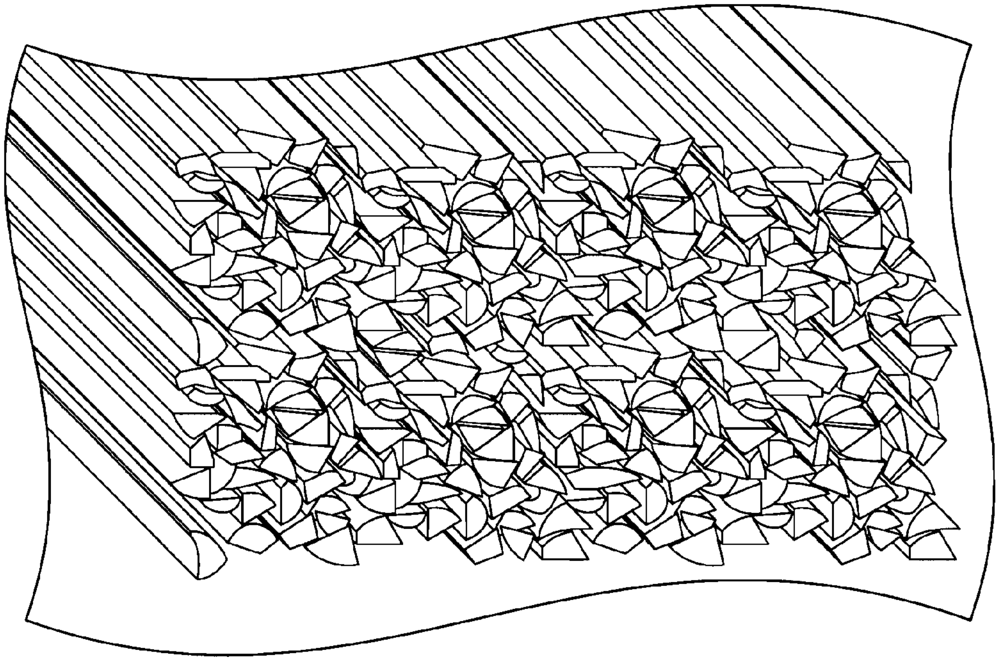
FIG. 3 is a crushed wood in accordance with one embodiment of the present invention.

For recovered woods having a substantial cross-section, e.g. larger than about 6-10 mm, a cross-sectional reduction step can be applied while substantially retaining and preserving linear strand lengths along wood grains. Generally, such cross-sectional reduction can be accomplished using a crusher, slitting/stranding machine, or other method to longitudinally break up the fibers for resin impregnating. In one aspect, the recovered wood can be selected and crushed radially along wood fibers. The final crushed wood thickness can generally be small enough to allow substantially uniform penetration of resin and optional dyes within a desired process time, while also large enough to still provide visual contribution of grains to the final product. FIG. 3 illustrates a crushed wood 10 having a non-uniform distribution of cross sectional shapes and sizes. Individual crushed pieces shown are strands which ultimately contribute to the grained appearance of the final product in at least two ways. First, the pieces each have a maintained natural grain which is typically visible in the final product. Second, the individual strands provide an appearance of striations or grains when molded adjacent other pieces in the final product. Variation in sizes, contours and shapes further contributes to reproducing the non-uniformity in grain appearance in natural wood. As a general guideline, the crushed wood has a thickness or cross-section of less than 6 mm, such as from 3 mm to about 5 mm, although 0.2 mm or smaller can be used as long as mechanical integrity is sufficient for processing. In one specific aspect, the crushed wood thickness can be from 0.2 to 10 mm. It can also be beneficial to provide for a non-uniform distribution of cross-sectional widths within these ranges. This can further augment replication and appearance of natural variations in wood grains. The crushed wood can optionally be bound into bundles for subsequent pretreatments, dying, drying and/or soaking treatments.

When the recovered wood is a veneer, veneer strips can be subjected to a steaming (similar equipment as for carbonizing) tank or boiling to break down the glue and/or formaldehyde. The steaming or boiling conditions can vary depending on the desired results, e.g. longer carbonization can change the color to make it darker. In one aspect, an ammonia mixture (e.g. water and ammonia mixed in a tank with about 1-5% of ammonia) can be used on the optionally dyed veneer scraps to deactivate some of the formaldehyde. Subsequently, the fibers can be steamed in a carbonization tank. The waste effluent of the ammonia can generally be reused. Although results can vary, ammonia can often decrease the formaldehyde level from about 20-30% to about 0.2%. For veneers, this step can be the pretreating step used to increase resin absorption or can be done in addition to a subsequent pretreatment step as described immediately below.

The crushed wood or veneer strips can then be pretreated in order to increase later resin absorption to form a degreased wood. The pretreatment step also can loosen fibers, soften the wood, release formaldehyde, and break down sugars which can otherwise attract nuisance bugs. The pretreatment can involve at least one of a vapor/steam treatment, boiling treatment, and chemical treatment. In one aspect, degreasing can be sufficient to achieve a neutral pH so the glue can absorb into the fibers, although degreasing can also rid the veneers and other by products of any contaminants from the primary processing, which can include among other sources release agents (i.e. grease) from press platens, forming lines, and general dirt and contaminants from storing, trucking, etc.

When the pretreating includes a vapor treatment, the crushed wood can be exposed to a high temperature vapor for an extended cook time. The high temperature vapor is most often steam, although other vapors can be used. In one aspect, the high temperature vapor is steam at a steam temperature from about 111° C. to about 150° C. such as 130° C. to about 145° C., although temperatures as low as 105° C. can be used if cook times are increased accordingly. Temperatures above about 150° C. tend to carbonize the wood and can sometimes produce undesirable results. However, different wood fibers react differently although typically carbonizing for longer than about 3 hours can over soften the fibers and reduce efficiency. Most often the vapor treatment also occurs under high pressure conditions. This helps to increase penetration rates and cook rates. As a guideline, a vapor pressure from about 1 MPa to about 1.5 MPa, is typically suitable although broadly pressures from about 1 MPa to about 3 MPa can also be suitable. Generally, the cook time can be long enough to provide a desired resin penetration time without excessive carbonizing of the wood. In one aspect, the cook time can be from about 1 hour to about 4 hours. In another aspect, the cook time can be about 1 to about 3 hours.

In another alternative, the pretreating can include steaming the crushed wood with a chemical agent. Although a number of chemical agents can be suitable hydrogen peroxide and/or sodium hydroxide have proven effective for a wide variety of wood materials. The time duration for chemical pretreatments can vary depending on the particular chemical agent, steam temperature, and desired resin impregnation rates. However, generally, a chemical treatment time from about 1 hour to about 48 hours, can be suitable. When using hydrogen peroxide and/or sodium hydroxide, a chemical treatment time from about 1 hour to about 2 hours has proven effective. Further, the chemical agent or agents can be used at varying concentrations. For example, about 2 to about 5 wt % hydrogen peroxide or about 1 to about 5 wt % sodium hydroxide can be effective.

Pretreating can optionally include cooking the crushed wood in boiling water. For example, the crushed wood can be boiled in water and then cooked in a retort. Typically boiling is performed at about 100° C. Boiling time can vary but is often from about 30 minutes to about 3 hours such as about 1 to about 2 hours. Boiling can generally be done prior to and in addition to either or both of the above steam treatments.

In some cases, the natural or inherent color of the wood is different from a desired color in the final product. In such cases, the degreased wood can be carbonized and/or dyed prior to resin impregnation and after the degreasing of the wood. The degreased wood can be soaked in a dye solution to form a dyed wood. It is generally desirable to have the dye solution substantially uniformly distributed throughout the dyed wood. This allows the wood product to be cut, sanded or shaped while retaining a substantially matching color. This further allows a final consumer or manufacturer to avoid extra color staining steps. Uniformity of dye can be controlled via a number of factors including, but not limited to, soaking time, soaking temperature, choice of dyes, additives, dimensions of crushed wood, and dye concentration. For example, a deeper shade can be achieved by extending dying times.

The dye solution can generally be an aqueous solution of a dye or a dispersion of an insoluble pigment dye. Non-limiting examples of suitable dye classes can include acid dyes, reactive dyes, direct dyes, vat dyes, disperse dyes, and sodium dyes. Acid dyes and reactive dyes are of particular interest due to their stability. In one specific aspect, the dye is a water soluble acid dye. In another aspect, the dye is a reactive dye. Non-limiting examples of suitable reactive dyes include reactive red X-3B, X-7B, K-2BP and K-2G, reactive black JL-E, reactive yellow K-GR and reactive red brown K-B2R. Optionally, pigments can be used which tend to have high lightfastness. In another alternative, the dye solution can further include UV stabilizers such as, but not limited to, citric acid, amines, antioxidants (vitamin C), etc. or other additives.

Dye soaking can be accomplished at any suitable ratio of dye solution and wood. However, as a general guideline, a bath ratio of degreased wood to dye solution of 1:10 to 1:20 has been effective. A lower bath ratio is apt to cause uneven dyeing, while a higher bath ratio can tend to increase dye consumption and cause waste. The concentration of dye in the dye solution can also vary and can depend on the type of dye, desired color shade, wood type, among other factors. However, dye concentration can often be from about 0.5 wt % to about 10 wt %, such as about 2 wt % to about 3 wt %. The dying step can optionally be moderately heated to facilitate permeation of dye throughout the wood. Temperatures from about 30° C. to about 98° C. are often suitable. In one specific embodiment of an acid dye, the dye soak temperature is about 93° C. The molecules of water-soluble acid dye are combined within the lignin of wood. Dyeing time is also related to the length of wood because dye generally permeates the inside of wood along the direction of fiber. The longer the wood, the more dyeing time needed. Generally, 0.8 mm veneer needs 3 hours for dyeing. Dye soak times can also vary but are most often from about 30 minutes to about 12 hours, such as about 2 to about 7 hours. In another specific aspect of a reactive dye, the dye concentration can be about 2 wt %, have a bath ratio of about 1:10, a dye soak temperature of about 60° C., and a dye time of about 4 to about 5 hours.

Dyeing equipment include, for example, an atmospheric-pressure dying machine, a vacuum dyeing machine, and high-pressure dyeing machine. Atmospheric-pressure dying machine is a so-called dye vat and includes a dye beck, feeding system, heating system, circulating system, air aid system and cage.

The dye solution can include one or more optional additives such as, but not limited to, impregnation accelerators, dye stabilizers, antioxidants, UV absorbers, biocides, fungicides and the like. Such additives can optionally be presented in the stabilizing soak, or resin soak step, depending on the particular additive and whether the component more effectively penetrates and remains in the wood during particular soaking steps. In one example, the dye solution can further comprise an impregnation accelerator. Such accelerators can prevent heavy adsorption before the dye enters the inside of wood cell, so that aberrations after wood dyeing are reduced or eliminated. Non-limiting examples of impregnation accelerators can include sodium sulfite. Concentration of the impregnation accelerator can vary, but in one aspect is from about 2.5 to about 3.5 wt %. Soaking can optionally be followed by rinsing to remove excess dye solution, e.g. a water rinse.

Subsequent to soaking the wood in the dye solution, the dye can have a tendency to migrate and/or bleed depending on the particular wood-dye combination. As such, the dyed wood can optionally be further soaked in a coloring stabilizing diluent in solution to form a stabilized dyed degreased wood. Non-limiting examples of suitable coloring stabilizing diluent can include polyene polyamine, polyethyl-ammonium, epichlorohydrin, alkalescent aqueous solution of sodium carbonate and sodium chloride, and combinations thereof In one example, the stabilizing treatment can be performed at a bath ratio of about 1:10 to about 1:20 at a moderately elevated temperature, e.g. 60° C. to 80° C. The stabilizing treatment time can also be relatively brief and is often from about 20 to about 30 minutes. As with the dying step, the stabilizing treatment can be optionally followed by water rinsing to remove excess stabilizing solution.

Dying can allow for tailoring of the colors to match a particular wood, style or appearance. For example, dyed wood can be adjusted to match exotic wood species or create a popular finish color. The thus dyed wood can produce rich and uniform color in the final product regardless of how the cured product is cut, milled or otherwise processed.

The degreased wood (which has optionally been dyed) can be dried sufficient to reduce a moisture content to produce a dried wood. Typically, the degreased wood can be dried sufficient to reduce the moisture content to 15 wt % or less, and in some cases 10 wt % or less. During drying of the degreased wood, heating temperatures and heating rates can be adjusted to achieve desirable results. Any suitable drying equipment can be used such as, but not limited to, air drying, oven drying, conveyor belt drying, and the like. Although other conditions can be suitable, the typical heating temperature can be sufficient to dry the wood in a reasonable time without causing substantial disruption or destruction of the wood fibers via rapid gas expansion. As a general guideline, the drying temperature can depend largely on the particular drying equipment, e.g. above freezing to 150° C. Drying times can also be reduced by separating or spreading wood out.

The dried wood can be soaked in a resin solution to form a resin impregnated wood. The degree of resin impregnation is relatively substantial so as to allow resin to impregnate substantially uniformly throughout and into even center portions of the wood pieces. Typically, the resin solution comprises an aqueous solution of an organic resin. Suitable organic resins can include, but are not limited to, urea-formaldehyde glue, phenolic glue, urea resin, natural plant gum, soy resin, plant-based resins, and combinations thereof Non-limiting examples of suitable phenolic glues can include Bakelite, Richlite, Tufnol, Syndyne, Novolac, MDI (diphenylmethane diisocyanate), and the like. Phenolic resins have the advantage of good endurance at high temperature, exposure to sunshine and erosion resistance. The resin solution can typically be an aqueous solution. In one aspect, about 1 ton of resin solution can be made of 250-350 kilos of resin, with the balance being water and minor additives. As with other soaking treatments, the soaking time can depend on the particular choice of materials, e.g. wood type, resin, concentrations of each, and temperatures. Soaking can optionally include minor heating, especially in colder environments, but generally effects soak time, e.g. soak time can be decreased by moderate heating such as 30° C. However, resin soak time can often be from about 3 to about 30 minutes, and in some cases about 10 to about 25 minutes, and in other cases about 3 to about 15 minutes. In one specific example, a resin solution to wood ratio of from 1:5.5 to about 1:20 can be suitable.

The resin impregnated wood can be dried to reduce the moisture content without substantially curing the resin to form a dried resin impregnated wood. This can be accomplished by drying at a drying temperature less than a cure temperature of the resin. For example, in the case of phenolic resins, a drying temperature can typically be from about 30° C. to about 55° C. Allowable drying temperatures will depend on the specific resin chosen and the associated drying time, e.g. a higher temperature may be suitable if the time is kept low enough to prevent substantial curing. Regardless, the drying temperature can be maintained a sufficient time to reduce the moisture content to about 10 wt % to about 18 wt %, such as about 12 wt % to about 18 wt %, although other moisture contents may also be suitable. Although not required, the recovered wood is typically treated loose through the pretreating, drying and soaking steps.

The dried resin impregnated wood can be molded. Generally, the dried resin impregnated wood can be oriented having a majority of wood fibers or strands oriented in a non-random predetermined pattern. The non-random pattern is selected to achieve a particular appearance in the final product. The arranged strands can then be compacted to form an uncured molded wood.

In one aspect, the dried resin impregnated wood can be placed in a mold having wood fibers oriented in a substantially common direction. In this approach, the wood fibers can be laid out longitudinally and substantially parallel to one another. The resulting reconstituted wood has striations in a bulk common direction and the appearance of natural wood. However, other alternative non-random patterns can be used to affect variations in visual appearance of the final product. For example, a knotty appearance can be achieved by laying a portion of the wood fibers transverse or orthogonal to another portion of wood fibers. More particularly, a first portion of the dried resin impregnated wood can be oriented having wood grains along a bulk longitudinal direction. At various depths within the laid first portion, a second portion of the dried resin impregnated wood can be oriented along a transverse direction with respect to the longitudinal direction. Thus, the final product can have a substantial portion of grained appearance along a length of the wood while the transverse wood fibers are exposed at ends such that they appear similar to knots in the wood with fibers flowing around those knots. The number and proportions of transverse versus longitudinal wood fibers can be varied for a particular visual affect (e.g. density of knotted features). In one aspect, the first portion can be a majority of the resin impregnated wood. In another aspect, the first portion and second portion comprise substantially the entire body of the impregnated wood which is laid into a mold. Other patterns can also be used in connection with this method.

Molding can involve pressure, and optionally heat, to form an uncured molded wood. Typically, substantially no wood fibers deviate from the common direction by more the 45°, e.g. less than 5%. Further, a dominant majority, e.g. typically greater than about 75% and often greater than 90%, of the wood fibers are oriented within 30° of the common direction. Depending on the wood selected, the uniformity of wood fiber orientation can be even higher. For example, branch wood sources can allow for substantially all of the wood fibers to be oriented substantially along the common direction. In one aspect, greater than 95% of the wood fibers can be oriented within 20° of the common direction. Uniformity in fiber direction can be achieved mechanically via vibrating sorters (e.g. which admit or sort pieces along their length) or manually by hand placement. These wood fibers or strands can be bound into uniform bundles for placement in a press. Further, the wood can be oriented having a non-uniform distribution of sizes both horizontally and vertically throughout the mass of wood to be molded. This can further improve replication of variations in natural grains, e.g. varied widths, lengthwise contours, colors, etc.

The molding can be accomplished in a hydraulic press or radio frequency press, which can be a hot press or a cold press, although other devices can be suitable. In one aspect, the hydraulic press applies a pressure from about 6 MPa to about 23 MPa, such as about 13 MPa to about 23 MPa or from about 16 MPa to about 19 MPa. Consolidation effectiveness can also depend on the particular size and shape of strands, orientation of strands, and the like. For example, the embodiments where portions of the wood strands are transverse to one another can require higher pressures than those where the wood strands are substantially all aligned in a common direction.

The uncured molded wood can then be cured to form the reconstituted wood block. Cure temperatures again can depend on the particular resin and materials chosen. However, as a general guideline, the curing can be accomplished at a cure temperature from about 50° C. to about 180° C. and a curing duration of about 10 to about 20 hours. In one specific case, the cure temperature can be from about 110° C. to about 155° C. and the curing duration can be about 10 to about 16 hours. For phenolic resins in particular, a curing temperature from about 140° C. to about 155° C. has proven particularly effective, although 11° C. to about 135° C. can also be suitable. Cure conditions can vary somewhat depending on the particular materials and strand sizes. Curing can optionally be performed and/or augmented using radio frequency curing.

Figure 4:
FIG. 4 is a schematic of a flooring segment showing natural wood grain appearance in accordance with one embodiment of the present invention.

The reconstituted wood block can then be used as-is or further processed. For example, the wood block can be milled, cut or otherwise reshaped to form a particular product in the same or similar manner to logs and lumber. In one specific application, the reconstituted wood block can be milled and cut to form interlocking flooring, e.g. tongue and groove. FIG. 4 illustrates a reconstituted wood product milled into a tongue and groove flooring slat having the wood fibers substantially oriented in a common direction. These variations in grain lines contribute to mimicking natural grain appearance and providing aesthetically attractive variations. Products can also be readily produced which have more uniform grain directions, e.g. using mulberry tend to provide more uniform grains. Alternatively, when portions of the resin impregnated wood are laid out transverse to another portion of the wood fibers, the final product has a knotty appearance.

The reconstituted wood articles can include a resin impregnated natural wood matrix where the wood matrix includes a plurality of wood pieces having wood fibers oriented in a substantially common direction. Further, the wood article can be substantially free of laminate layers and having an appearance of natural wood grains along surfaces of the wood article regardless of direction in sectional cuts. Certain embodiments of the reconstituted wood can have a density of about 0.8 to about 1.2 kg/cm$^3$ and features peculiar grain, refined texture, extraordinary performance. These reconstituted wood products can be formed without time intensive aging processes commonly practiced in the industry. The reconstituted wood products can also be substantially free from macropores, e.g. pores or spaces greater than about 0.2 mm, and in some cases 0.05 mm. The reconstituted molded wood can be characterized by rich grains and colors, stable performance, and direct applications in processing floor, furniture, building facilities, or as a substitute for logs in almost any application. Furthermore, the reconstituted molded wood so produced is better than common natural wood in many metrics and needs no treatment for resisting insect, mold, moisture, erosion and cracking. Additionally, the reconstituted molded wood can have high rigidity, pressure resistance, impact resistance and deformation resistance. Utilizing such secondary-grade processed wood to produce reconstituted molded wood is an effective way to turn trash into valuable products.

Example 1

Gather wood scraps left after rotary cutting from a log, the scraps having a thickness of 1.0~2.0 cm. Treat the wood scraps with 135~140° C. high-temperature water vapor at a pressure of 1.5 Mpa for 1.5 hours. Dry the wood, reducing its water content to about 10% to help the wood to absorb resin solution more easily. Immerse the dried wood in phenolic resin resolution for 10 minutes to allow the wood to fully absorb the resin. Control drying temperature at 55° C. to dry the wood immersed in the resin glue, reducing its water content to 12~18%.

Bind the wood into uniform bundles with a length of 1.93 m and a weight of 3~10 Kg. Press the bundles into a mold with hydraulic press at a pressure of 17~18 Mpa. Feed the molded intermediate product into high-temperature curing equipment, and allow the phenolic glue to fully consolidate at 150° C. temperature for 14 hours, so that a reconstituted molded wood is obtained.

Example 2

Use wood scraps left after rotary cutting from a log with a thickness of 0.5~0.8 cm. Treat the wood with 135~140° C. high-temperature vapor at a pressure of 1.5 MPa for 3 hours, and disperse glued scraps when they are still hot. Dry the wood, reducing its water contents to about 10% to help the wood to absorb resin solution more easily. Immerse the dried wood in phenolic resin resolution for 7 minutes to allow the wood to fully absorb the resin. Control drying temperature at 50° C. to dry the wood immerged in the resin glue, reducing its water content to 12~18%.

Bind the wood into uniform bundle with a length of 1.93 m and a weight of 3~10 Kg. Press the bundles into mould with hydraulic press at a pressure of 17~19 Mpa. Feed the molded intermediate product into high-temperature curing equipment, and allow the phenolic glue fully consolidate at 152° C. temperature for 15 hours, so that reconstituted molded wood is obtained.

Example 3

Alternately distribute the wood scraps left after rotary cutting from a log after the treatment of steaming, drying, immerging glue, drying in embodiment 1 and the wood scraps of reconstituted decorative wood after the treatment of steaming, drying, immerging glue, drying again in embodiment 2, and bind them into uniform bundles with a length of 1.93 m and a weight of 3~10 Kg. Press the scrap bundles into mould with hydraulic press at a pressure of 17~18 Mpa. Consolidate the moulded intermediate product at 150° C. temperature for 14 hours, so that reconstituted moulded wood is obtained. The decorative patterns of such molded wood are abundant.

Example 4

Use wood scraps left after rotary cutting from a log with a thickness of 2.0~2.5 cm, and treat the wood scraps with 135~140° C. high-temperature water vapor at a pressure of 1.5 MPa for 2 hours. Dry the wood, reducing its water contents to about 10% to help the wood to absorb resin solution more easily Immerse the dried wood in phenolic resin resolution for 15 minutes to allow the wood to fully absorb the resin. Control drying temperature at 50° C. to dry the wood immerged in the resin glue, reducing its water content to 12~18%.

Bind the wood into uniform bundle with a length of 1.93 m and a weight of 3~10 Kg. Press the bundles into mould with hydraulic press at a pressure of 17~19 Mpa. Feed the molded intermediate product into high-temperature curing equipment, and allow the glue fully consolidated at 151° C. temperature for 15 hours, so that reconstituted molded wood is obtained.

Example 5

Crush 3~80 mm diameter mulberry branches with crusher along radial direction. The radial size of mulberry branches crushed is 3~5 mm. Bind the mulberry branches crushed into uniform bundles of a length of 193~250 cm and a weight of 3~4 kg.

Cook the bundled mulberry branches in boiling water for 2 hours, carbonize with a retort for 3 hours at steam pressure of 1.5 kg. Dry the processed mulberry branches, reducing its moisture content to <10% Immerse the dried mulberry branches in phenolic glue for 15 min to allow the mulberry branches to absorb glue fully. Dry the mulberry branches immerged in glue at controlled temperature of 50° C., reducing its moisture content to 10%~18%.

Load the dried raw material in a rectangle die of 2 m length and press into a mold at a pressure of 17 Mpa~19 Mpa. Feed the intermediate product with the die in high-temperature curing equipment and cure at 110~135° C. for 17 hours, so that mulberry branch molded wood is obtained.

Example 6

Crush 3~200 mm diameter wingceltis branches with crusher along radial direction. The radial size of wingceltis branches crushed is 3~5 mm. Bind the wingceltis branches crushed into uniform bundles of a length of 193 cm and a weight of 3~4 kg.

Cook the bundled wingceltis branches in boiling water for 3 hours, carbonize with a retort for 3.5 hours at steam pressure of 1.5 kg. Dry the processed wingceltis branches, reducing its moisture content to <10%. Immerse the dried wingceltis branches in phenolic glue for 20 min to allow the mulberry branches to absorb glue fully. Dry the wingceltis branches immerged in glue at controlled temperature of 50° C., reducing its moisture content to 10%~18%.

Load the dried raw material in a rectangle die of 2.5 m length and press into mould at a pressure of 18 Mpa~20 Mpa. Feed the intermediate product with the die in high-temperature curing equipment and cure at 110~135° C. for 16 hours, so that wingceltis branch moulded wood is obtained.

Example 7

Select the veneer of a thickness of <2 5 mm and cook in 2% sodium hydroxide for 30 minutes for chemical degreasing. Then dry the wood, reducing its moisture content to 10~15%.

Put the degreased veneer in acid dye solution with 3% sodium sulfite (JL series, acid dye of yellow light, high concentration, high light resistance manufactured by Shandong Jinlu Dye Chemical Engineering Co. Ltd.). The bath ratio is 1:10 and concentration of dye solution is 3%. Raise temperature to 93° C. and soak in the dye solution for 3 hours. Then rinse clean with water to remove the dye clinging to wood surfaces.

Immerse the wood in a coloring stabilizer diluent condensed from polyene polyamine, polyethyl-ammonium and epichlorohydrin with a bath ratio of 1:10 at a temperature of 60° C. for 30 minutes, then clean with water to remove the coloring stabilizer clinging to wood surface.

Dry the wood, reducing its moisture content to <10%. Immerse the wood in phenolic resin solution for 15 minutes. Dry the wood immersed in resin, at 55° C., reducing its moisture content to 10~18%. Place the wood in die and press into mold with a pressure of 17 Mpa~18 Mpa. Cure the moulded intermediate product at 150° C. and consolidate the resin for 14 hours, so that reconstituted molded wood is obtained.

Example 8

Select small firewood which is radially crushed and has <6 mm radial diameter. Load the wood into a pressure vessel, feed a high-temperature steam and keep 140° C. temperature and 1·1.5 Mpa pressure for 3 hours to degrease. Dry the wood, reducing its moisture content to 10~15%.

Put the degreased small firewood in veneer in a pressure vessel loaded with acid dye (JL series, acid dye of yellow light, high concentration, high light resistance manufactured by Shandong Jinlu Dye Chemical Engineering Co. Ltd.). The bath ratio is 1:10 and concentration of dye solution is 2%. Raise temperature to 93° C. and dye for 3 hours. Then rinse clean with water to remove the dye clinging to wood surface.

Immerse the wood in the coloring stabilizer diluent condensed from polyene polyamine, polyethyl-ammonium and epichlorohydrin with a bath ratio of 1:10 at a temperature of 60° C. for 30 minutes, then rinse clean with water to remove the coloring stabilizer clinging to wood surface.

Dry the wood, reducing its moisture content to <10%. Immerse the wood in phenolic resin solution for 15 minutes. Dry the wood immerged in resin, at 55° C., reducing its moisture content to 10~18%. Put the wood in die and press into mould with a pressure of 17 Mpa~18 Mpa. Cure the molded intermediate product at 150° C. and consolidate the resin for 14 hours, so that reconstituted molded wood is obtained.

Example 9

Select the veneer of a thickness of <2.5 mm and cook with 2% sodium hydroxide for 30 minutes for chemical degreasing. Then dry the wood, reducing its moisture content to 10~15%.

Put the degreased veneer in reactive dye solution (reactive red X-3B manufactured by Shandong Jinlu Dye Chemical Engineering Co. Ltd.). The bath ratio is 1:10 and concentration of dye solution is 3%. Raise temperature to 60° C. and dye for 3 hours. Then clean with water to remove the dye clinging to wood surface.

Immerge the wood in the alkalescent aqueous solution of sodium carbonate and sodium chloride with a bath ratio of 1:10 at 60° C. temperature for 30 minutes, then clean with water to remove the coloring stabilizer clinging to wood surface.

Dry the wood, reducing its moisture content to <10% Immerge the wood in phenolic resin solution for 10 minutes. Dry the wood immerged in resin, at 55° C., reducing its moisture content to 10~16%. Put the wood in die and press into mould with a pressure of 17 Mpa~18 Mpa. Cure the molded intermediate product at 148° C. and consolidate the resin for 15 hours, so that reconstituted molded wood is obtained.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A reconstituted wood article, comprising:

a) a resin impregnated natural wood matrix, said wood matrix including a plurality of wood pieces having wood fibers oriented in a non-random predetermined pattern, said wood article being substantially free of laminate layers and having an appearance of natural wood grains along surfaces of the wood article regardless of direction in sectional cuts.

2. The reconstituted wood article of claim 1, wherein the wood fibers are substantially all in a common direction.

3. The reconstituted wood article of claim 1, wherein a first portion of the wood fibers are oriented along a longitudinal direction and a second portion of the wood fibers are oriented along a transverse direction with respect to the longitudinal direction.

4. The reconstituted wood article of claim 1, wherein the first portion is a majority of the wood fibers.

5. The reconstituted wood article of claim 1, wherein the first portion and the second portion comprises substantially all of the wood fibers.

6. The reconstituted wood article of claim 3, wherein the first portion of wood fibers create a grained appearance along a length of the reconstituted wood article while the second portion of wood fibers are exposed at ends such that the second portion of wood fibers have an appearance of knots in the reconstituted wood article with the first portion of wood fibers flowing around the knots.

7. The reconstituted wood article of claim 1, wherein the wood pieces are dyed such that the reconstituted wood article has substantially uniform color throughout the reconstituted wood article.

8. The reconstituted wood article of claim 1, wherein the wood pieces comprise mulberry branch wood.

9. The reconstituted wood article of claim 1, wherein the wood pieces comprise wingceltis branch wood.

10. The reconstituted wood article of claim 1, wherein the wood pieces are oriented having a non-uniform distribution of sizes both horizontally and vertically throughout the reconstituted wood article.

11. The reconstituted wood article of claim 1, wherein the reconstituted wood article is a tongue and groove flooring slat.

12. The reconstituted wood article of claim 1, wherein the wood pieces are recovered wood comprising at least one of branches, poles, rotary milling scraps, non-laminated veneers, and brushwood.

13. The reconstituted wood article of claim 1, wherein the wood pieces have a high aspect ratio which is at least 7:1.

14. The reconstituted wood article of claim 1, wherein the wood pieces have a thickness less than 6 mm.

* * * * *